US007739531B1

(12) United States Patent
Krishnan

(10) Patent No.: US 7,739,531 B1
(45) Date of Patent: Jun. 15, 2010

(54) DYNAMIC VOLTAGE SCALING

(75) Inventor: Musaravakkam Samaram Krishnan, Cupertino, CA (US)

(73) Assignee: Nvidia Corporation, Santa Clara, CA (US)

( * ) Notice: Subject to any disclaimer, the term of this patent is extended or adjusted under 35 U.S.C. 154(b) by 708 days.

(21) Appl. No.: 11/073,229

(22) Filed: Mar. 4, 2005

(51) Int. Cl.
G06F 1/04 (2006.01)

(52) U.S. Cl. .............. 713/322; 713/300; 713/310; 713/320; 713/321; 713/323; 713/324; 713/340; 713/330

(58) Field of Classification Search .......... 713/300–340
See application file for complete search history.

(56) References Cited

U.S. PATENT DOCUMENTS

| | | | |
|---|---|---|---|
| 4,335,445 A | 6/1982 | Nercessian | |
| 4,544,910 A * | 10/1985 | Hoberman | 340/333 |
| 4,679,130 A | 7/1987 | Moscovici | |
| 4,739,252 A | 4/1988 | Malaviya et al. | |
| 4,893,228 A | 1/1990 | Orrick et al. | |
| 5,086,501 A | 2/1992 | DeLuca et al. | |
| 5,103,110 A | 4/1992 | Housworth et al. | |
| 5,167,024 A | 11/1992 | Smith et al. | |
| 5,201,059 A | 4/1993 | Nguyen | |
| 5,204,863 A | 4/1993 | Saint-Joigny et al. | |
| 5,218,704 A | 6/1993 | Watts, Jr. et al. | |
| 5,230,055 A | 7/1993 | Katz et al. | |
| 5,239,652 A | 8/1993 | Seibert et al. | |
| 5,337,254 A * | 8/1994 | Knee et al. | 716/1 |
| 5,410,278 A | 4/1995 | Itoh et al. | |
| 5,422,806 A | 6/1995 | Chen et al. | |
| 5,440,520 A | 8/1995 | Schutz et al. | |
| 5,461,266 A | 10/1995 | Koreeda et al. | |
| 5,502,838 A | 3/1996 | Kikinis | |
| 5,511,203 A | 4/1996 | Wisor et al. | |
| 5,513,152 A | 4/1996 | Cabaniss | |
| 5,560,020 A | 9/1996 | Nakatani et al. | |
| 5,561,692 A * | 10/1996 | Maitland et al. | 375/371 |

(Continued)

FOREIGN PATENT DOCUMENTS

EP 0381021 8/1990

(Continued)

OTHER PUBLICATIONS

Baker, K. et al; "Shmoo Plotting: the Black Art of IC Testing"; IEEE Design & Test of Computers, IEEE vol. 14, No. 3; Jul. 1, 1997, pp. 90-97, XP000793305 ISSN: 0740-7475 the whole document.

(Continued)

Primary Examiner—Tse Chen

(57) ABSTRACT

An apparatus and method for dynamically controlling the maximum frequency of operation of the IC is provided. The invention optimizes power consumption in a device by measuring a current maximum frequency of operation and adjusting IC operating voltage to provide a desired maximum operating frequency. The invention provides an apparatus and method for controlling multiple voltages in an IC to independently adjust maximum operating frequencies for a plurality of separate portions of the IC. The invention may equally be applied to a group of ICs. The invention further provides a method for calibrating an IC. Thus, the apparatus facilitates the operation of an IC at a minimum voltage for a selected maximum frequency, thereby minimizing power consumption overall a wide range of operating frequencies.

26 Claims, 8 Drawing Sheets

U.S. PATENT DOCUMENTS

| | | | |
|---|---|---|---|
| 5,568,103 A | 10/1996 | Nakashima et al. | |
| 5,592,173 A | 1/1997 | Lau et al. | |
| 5,594,360 A | 1/1997 | Wojciechowski | |
| 5,680,359 A | 10/1997 | Jeong | |
| 5,682,093 A | 10/1997 | Kivela | |
| 5,692,204 A | 11/1997 | Rawson et al. | |
| 5,717,319 A | 2/1998 | Jokinen | |
| 5,719,800 A | 2/1998 | Mittal et al. | |
| 5,727,208 A | 3/1998 | Brown | |
| 5,745,375 A | 4/1998 | Reinhardt et al. | |
| 5,752,011 A | 5/1998 | Thomas et al. | |
| 5,754,869 A | 5/1998 | Holzhammer et al. | |
| 5,757,171 A | 5/1998 | Babcock | |
| 5,764,110 A | 6/1998 | Ishibashi | |
| 5,778,237 A | 7/1998 | Yamamoto et al. | |
| 5,796,313 A | 8/1998 | Eitan | |
| 5,812,860 A | 9/1998 | Horden et al. | |
| 5,815,724 A | 9/1998 | Mates | |
| 5,825,674 A | 10/1998 | Jackson | |
| 5,848,281 A * | 12/1998 | Smalley et al. | 713/322 |
| 5,884,049 A | 3/1999 | Atkinson | |
| 5,894,577 A | 4/1999 | MacDonald et al. | |
| 5,923,545 A | 7/1999 | Nguyen | |
| 5,933,649 A | 8/1999 | Lim et al. | |
| 5,940,785 A | 8/1999 | Georgiou et al. | |
| 5,940,786 A | 8/1999 | Steeby | |
| 5,974,557 A | 10/1999 | Thomas et al. | |
| 5,977,763 A | 11/1999 | Loughmiller et al. | |
| 5,996,083 A | 11/1999 | Gupta et al. | |
| 5,996,084 A | 11/1999 | Watts | |
| 6,011,403 A | 1/2000 | Gillette | |
| 6,035,407 A | 3/2000 | Gebara et al. | |
| 6,047,248 A | 4/2000 | Georgiou et al. | |
| 6,172,943 B1 | 1/2001 | Yuzuki | |
| 6,229,747 B1 | 5/2001 | Cho et al. | |
| 6,242,936 B1 | 6/2001 | Ho et al. | |
| 6,407,571 B1 | 6/2002 | Furuya et al. | |
| 6,422,746 B1 | 7/2002 | Weiss et al. | |
| 6,425,086 B1 | 7/2002 | Clark et al. | |
| 6,426,641 B1 | 7/2002 | Koch et al. | |
| 6,457,134 B1 | 9/2002 | Lemke et al. | |
| 6,476,632 B1 | 11/2002 | La Rosa et al. | |
| 6,489,796 B2 | 12/2002 | Tomishima | |
| 6,657,504 B1 | 12/2003 | Deal et al. | |
| 6,668,346 B1 * | 12/2003 | Schulz et al. | 714/724 |
| 6,792,379 B2 | 9/2004 | Ando | |
| 6,815,971 B2 | 11/2004 | Wang et al. | |
| 6,853,259 B2 * | 2/2005 | Norman et al. | 331/66 |
| 6,914,492 B2 * | 7/2005 | Hui et al. | 331/57 |
| 6,970,798 B1 * | 11/2005 | Cao et al. | 702/120 |
| 7,042,296 B2 * | 5/2006 | Hui et al. | 331/17 |
| 7,068,557 B2 * | 6/2006 | Norman et al. | 365/212 |
| 7,112,978 B1 | 9/2006 | Koniaris et al. | |
| 7,129,745 B2 | 10/2006 | Lewis et al. | |
| 7,180,322 B1 | 2/2007 | Koniaris et al. | |
| 7,334,198 B2 | 2/2008 | Ditzel, et al. | |
| 7,336,090 B1 | 2/2008 | Koniaris et al. | |
| 7,336,092 B1 | 2/2008 | Koniaris et al. | |
| 7,348,827 B2 | 3/2008 | Rahim et al. | |
| 7,363,176 B2 | 4/2008 | Patel et al. | |
| 7,509,504 B1 | 3/2009 | Koniaris et al. | |
| 2002/0002689 A1 | 1/2002 | Yeh | |
| 2002/0026597 A1 | 2/2002 | Dai et al. | |
| 2002/0029352 A1 | 3/2002 | Borkar et al. | |
| 2002/0032829 A1 | 3/2002 | Dalrymple | |
| 2002/0073348 A1 | 6/2002 | Tani | |
| 2002/0083356 A1 | 6/2002 | Dai | |
| 2002/0087896 A1 | 7/2002 | Cline et al. | |
| 2002/0116650 A1 | 8/2002 | Halepete et al. | |
| 2002/0138778 A1 | 9/2002 | Cole et al. | |
| 2002/0178390 A1 | 11/2002 | Lee | |
| 2002/0194509 A1 | 12/2002 | Plante et al. | |
| 2003/0036876 A1 | 2/2003 | Fuller, III et al. | |
| 2003/0065960 A1 | 4/2003 | Rusu et al. | |
| 2003/0074591 A1 | 4/2003 | McClendon et al. | |
| 2003/0133621 A1 * | 7/2003 | Fujii et al. | 382/257 |
| 2003/0189465 A1 | 10/2003 | Abadeer et al. | |
| 2004/0025061 A1 | 2/2004 | Lawrence | |
| 2004/0073821 A1 | 4/2004 | Naveh et al. | |
| 2004/0123170 A1 | 6/2004 | Tschanz et al. | |
| 2004/0128631 A1 | 7/2004 | Ditzel et al. | |
| 2005/0218871 A1 * | 10/2005 | Kang et al. | 323/265 |
| 2005/0268189 A1 * | 12/2005 | Soltis, Jr. | 714/724 |
| 2005/0289367 A1 * | 12/2005 | Clark et al. | 713/300 |
| 2006/0074576 A1 | 4/2006 | Patel et al. | |
| 2007/0229054 A1 | 10/2007 | Dobberpuhl et al. | |
| 2007/0296440 A1 | 12/2007 | Takamiya et al. | |
| 2008/0143372 A1 | 6/2008 | Koniaris et al. | |

FOREIGN PATENT DOCUMENTS

| | | |
|---|---|---|
| EP | 0501655 | 9/1992 |
| EP | 0978781 | 9/2000 |
| EP | 1398639 | 3/2004 |
| EP | 0474963 | 8/2009 |
| JP | 409185589 | 7/1997 |
| WO | 0127728 | 4/2001 |

OTHER PUBLICATIONS

Baker, K. et al; "Wafer Burn-In Isolation Circuit" IBM Technical disclosure Bulletin, IBM Corp. New York, US, vol. 32, No. 6B, Nov. 1, 1989, pp. 442-443, XP00073858 ISSN: 0018-8689 the whole documents.

"Computer Software", Wikipedia, http://en.wikipedia.org/wiki/software, retrieved May 2, 2007.

High-Speed, Digitally Adjusted Stepdown Controllers for Notebook CPUS', Maxim Manual, pp. 11 & 21.

"Operation U (Refer to Functional Diagram)". LTC 1736 Linear Technology Manual, p. 9.

Oner, H. et al., "A Compact Monitoring Circuit for Real-Time On-Chip Diagnosis of Hot-Carrier Induced Degradation" Microelectronics Test Structures, 1997. ICMTS 1997. Proceedings, IEEE International Conference on Monterey, CA , pp. 72-76.

* cited by examiner

DYNAMIC VOLTAGE SCALING

BACKGROUND OF THE INVENTION

1. Field of the Invention

The present invention relates to power consumption within an Integrated Circuit ("IC"). The present invention more particularly relates to optimization techniques to control power consumption within an IC.

2. Description of Related Art

Power consumption in integrated circuit ("IC") devices, including application specific IC ("ASIC") devices and system-on-chip ("SOC") devices, is dependent on both voltage and frequency. Increased power consumption necessitates the use of larger power supplies and more efficient cooling systems and is particularly problematic in portable, handheld devices. Increased power typically is resolved by providing more powerful batteries and cooling requirements thereby limiting the ability to produce smaller, lighter devices.

Many current systems are designed to accommodate a highest anticipated frequency of operation and suffer from relatively low percentage of productive processing cycles because processors in the systems are idle for large portions of time. Other current systems compromise performance to achieve lower power consumption. Another compromise commonly found in current devices monitors system activity and powers down the current devices to conserve battery life. Such compromises are prevalent in battery-powered portable devices.

Therefore, it would be desirable to have a system that can deliver high-performance operation on demand and can further minimize power usage in systems that have variable performance requirements.

BRIEF SUMMARY OF THE INVENTION

The present invention provides an apparatus and method for dynamically controlling the operating voltage of an IC device and minimize power consumption while meeting changing application requirements for operating frequency. The present invention provides an apparatus in which the operating voltage of the device can be dynamically adjusted permitting applications to vary frequency of operation of the device sufficient to meet processing needs. Thus, the apparatus may provide a minimum voltage for a selected maximum frequency, thereby minimizing power consumption over a wide range of operating frequencies.

The present invention provides a method for controlling a current maximum frequency of operation under variable operating voltages and temperatures and with consideration for variances in manufacturing processes that affect performance of IC devices. The present invention also provides for the monitoring of specific areas of an IC to provide localized control of power consumption subject to the requirements of the frequency of operation and to accommodate differences in performance of different cell libraries that may be used in the IC device.

By providing control over the operating voltage and an ability to measure and determine the maximum operating frequency of a device under any given operating conditions, the present invention may be used to reduce power dissipation requirements, prolong battery life and provide for more compact packaging of portable electronic devices.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE INVENTION

Figure 1:
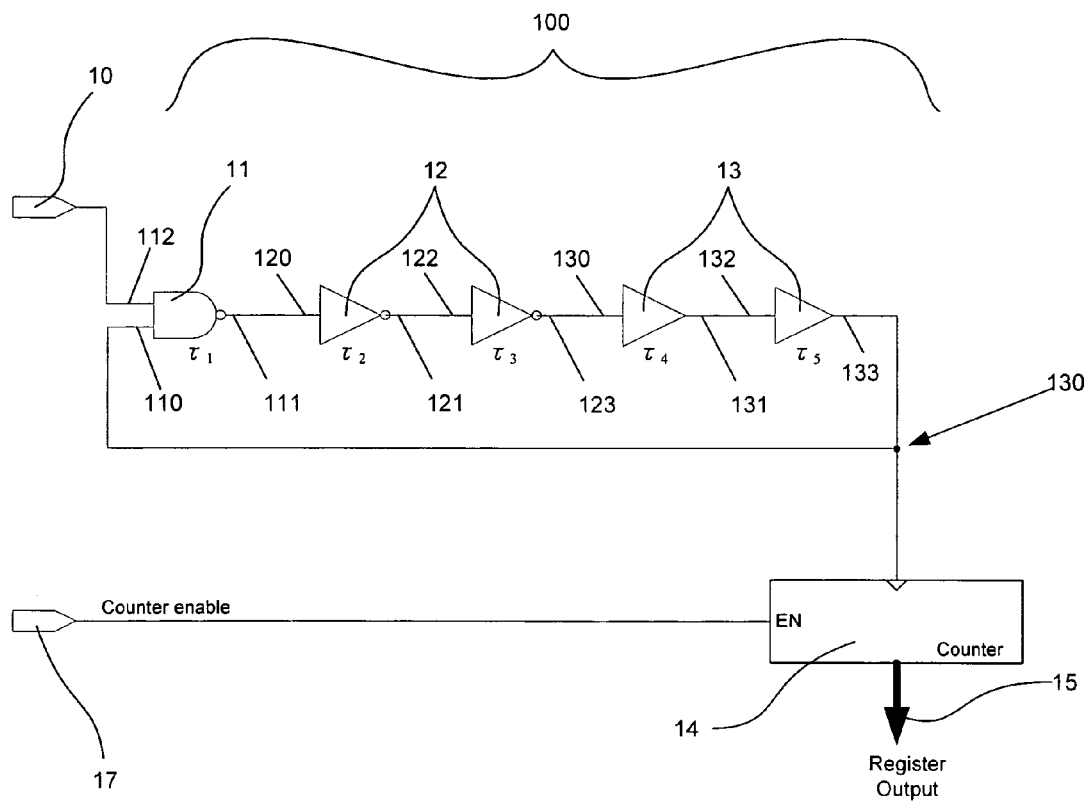
FIG. 1 is a simplified schematic representation of a ring oscillator.

Embodiments of the present invention will now be described in detail with reference to the drawings, which are provided as illustrative examples so as to enable those skilled in the art to practice the invention. Notably, the figures and examples below are not meant to limit the scope of the present invention. Where certain elements of these embodiments can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the components referred to herein by way of illustration.

The present invention provides an apparatus and method for optimizing the performance an electronic circuit by adjusting the voltage applied to the circuit in order to control speed of operation. The invention is well-suited for optimizing performance of circuitry contained on a physical device including integrated circuit ("ICs"), application-specific IC ("ASIC") devices, system-on-chip ("SOC") devices, Multi-chip Packages ("MCP") and various field programmable gate array ("FPGA") devices. For the purposes of this description, the term "IC" will be understood to include any of these devices. It will become apparent to one skilled in the art that application of various aspects the invention is not limited to single physical devices and other, multi-component devices and circuits may benefit from implementation of the present invention.

The present invention provides a method for characterizing the performance of an IC under variable operating conditions in which variations in performance may be attributable to manufacturing process, operating voltage and operating temperature. The combination of process, voltage and temperature, known hereinafter as "PVT," may typically define the operating point of the IC. The present invention provides a combination of device fabrication, hardware, firmware and software techniques to characterize and monitor device performance based in part on dynamic power consumption of the device.

Embodiments of the invention optimize the performance of an IC by adjusting operating voltage to permit the IC to operate at frequencies up to a maximum frequency of operation ("$f_{MAX}$"). Specifically, all applications running on the IC at any given time may be guaranteed to perform without discernible errors if the frequency of operation does not exceed $f_{MAX}$. Typically $f_{MAX}$ is selected to provide a processing capacity required by an application. Aspects of the present invention provide for the dynamic adjustment of operating voltage in response to changes in processing requirements affecting $f_{MAX}$ and provide optimal power consumption while maintaining an adequate frequency of operation. It will be appreciated the value of $f_{MAX}$ for a selected voltage may vary with fluctuations in operating temperature, such fluctuations being attributable to changes in power dissipation by the IC, changes in ambient temperature and so on.

The present invention recognizes that adjustments in the operating voltage affect dynamic power consumption of the IC. Dynamic power consumption of the IC is a measure of power usage attributable to the charging of capacitive loads and can be calculated as:

$$P=CV^2f$$

where P is dynamic power, C is capacitive load of the circuit, V is supply voltage applied to the circuit and f is the frequency of operation of the circuit. It is apparent from this formula that the dynamic power consumed by the IC is more responsive to changes in the operating voltage than changes in frequency of operation. Thus, power consumption of the IC may be optimized by maintaining the lowest core voltage ("$V_{DD}$") value that will support a maximum frequency of operation required of the IC.

Referring now to FIG. 1, embodiments of the present invention provide an apparatus for monitoring the value of $f_{MAX}$ and adjusting $V_{DD}$ to maintain a desired level of performance with minimum power dissipation. In the example depicted in FIG. 1, the value of $f_{MAX}$ may be determined by measuring propagation delays in a ring oscillator comprising a plurality of logic elements 100 connected serially to form a ring. The plurality of logic elements 100 includes non-inverting elements 13 and an odd number of inverting elements 11 and 12. Each of the inverting elements 11, 12 is configured to receive digital signals at one or more inputs 110, 120 and 122 and provide inverted versions of the input digital signals at an output 111, 121 and 123. Each of the non-inverting elements 13 is configured to receive digital signals at one or more inputs 130, 132 and provide non-inverted versions of the input digital signals at an output 131, 133. For each of the plurality of logic elements 100, transitions of digital signals (e.g. from "0" to "1") presented at an input 110, 120, 122, 130 and 132 cause associated transitions to appear at an output 111, 121, 123, 131 and 133 after a propagation delay associated with the respective logic element 11, 12 and 13.

The plurality of logic elements 100 may be implemented from a mixture of gates and functional elements. For example, inverting elements 11, 12 may be implemented using logic gates such as NAND (as shown at 11), NOR and Exclusive NOR gates and non-inverting elements 13 may be implemented using logic gates such as AND gates, OR gates, buffers, drivers and delay cells. It will be appreciated that the propagation delays associated with each of the plurality of logic elements 100 may be different from propagation delays associated with any other of the plurality of logic elements 100. It will also be appreciated that the propagation delay of each of the plurality of inverters is related to $f_{MAX}$ and, therefore, the value of $f_{MAX}$ may be derived from propagation delay measurements.

Continuing with the example of FIG. 1, the output 111, 121, 123, 131, 133 of each of the plurality of logic elements 100 is connected to an input 120, 122, 130, 132, 110 of another of the plurality of the logic elements 100, such that the plurality of logic elements 100 is configured as a single ring. In the example, a first inverter 11 is formed from a NAND gate to provide a gating function used for enabling operation of the ring oscillator. A control signal 10 is connected to a gating input 112 of the first logic element 11. Thus, operation of the ring oscillator may be disabled by driving the control signal 10 to logic 0 and enabled by setting the control signal 10 to logic 1. Control of ring oscillator operation can be exercised through software. When the ring oscillator is disabled, a first input 110 of the first logic element 11 is forced to logic 0. When the ring oscillator is enabled by setting input 112 on the first logic element to 1, the output 111 of the first logic element 11 transitions to the opposite state of its input 110 and this transition propagates through the ring oscillator, finally feeding back to the first input 110. Because of the odd number of inversions in the ring oscillator, the result is a change in the original state of input 110 to the first logic element that causes a second transition to traverse the ring oscillator. The ring oscillator circuit is thus inherently unstable when the control signal 10 is set to logic 1, and the ring oscillator oscillates with a period of 2 T where T is the time required for a signal transition to traverse the plurality of logic elements 100.

Continuing with the example shown in FIG. 1, a transition in the digital signal applied to the first input of the first inverter 11 propagates through the first inverter 11 with a first delay ($\tau_1$). The delayed signal thence passes through the remainder of the plurality of logic elements 100 accumulating additional delays $\tau_2$, $\tau_3$, $\tau_4$, $\tau_5$, etc. before the transition appears at the second input of the first inverter 11. The period of oscillation may be calculated 2T, where:

$$T=(\tau_1+\tau_2+\tau_3+\tau_4+\ldots+\tau_n),$$

where n is the total number of logic elements in the ring oscillator.

It will be appreciated that the frequency of oscillation of the ring oscillator is ½T. In the example, the value of n is 5. The number of logic elements used in a ring oscillator is selected based on factors including preferred ring oscillator frequency, area of the IC 20 and quantity of different cell technologies and libraries used on the IC 20.

Figure 2:
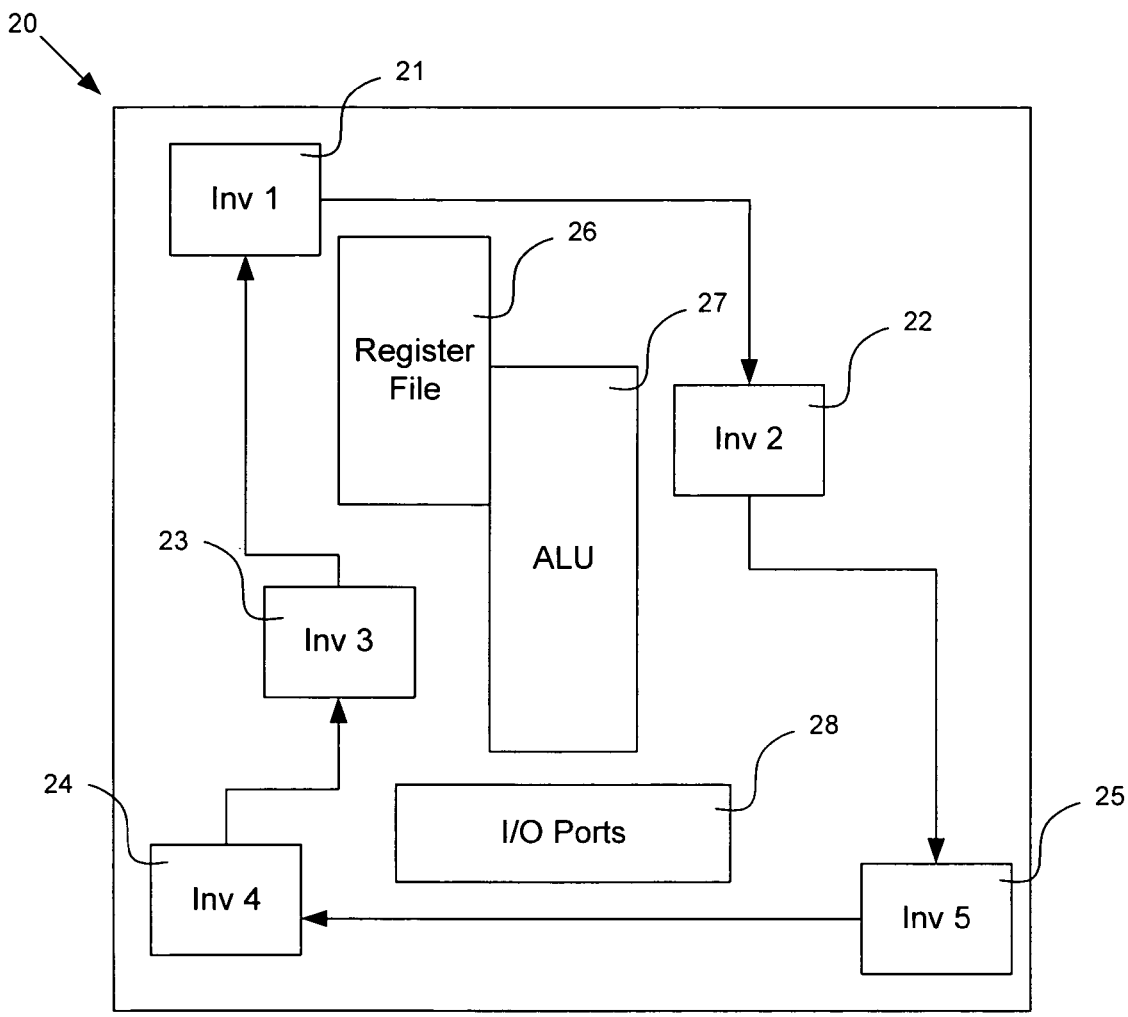
FIG. 2 is a block diagram showing the layout of a simplified ring oscillator within an IC.

FIG. 2 provides an example of a simplified layout illustrating the deployment of a ring oscillator within an IC 20. As discussed above, for a selected operating voltage, propagation delays are typically dependent on factors including manufacturing parameters and temperature of operation. Further, in some embodiments a plurality of ring oscillators may be implemented to better represent performance of portions of the IC 20 wherein the portions are characterized by factors including location on the IC 20, frequency of operation of the portions, voltage and current requirements of the portions and circuit structure used to build the portions. In these embodiments the plurality of ring oscillators may be dispersed throughout the IC 20. In some embodiments, complete ring oscillators may be placed at different physical locations throughout the IC 20. In other embodiments, constituent elements of an individual ring oscillator may be dispersed throughout the IC 20 and in at least some embodiments, a combination of dispersed rings and dispersed constituents may be implemented. In the example, ring dispersal may be implemented by placing logic elements 21, 22, 23, 24, 25 at or near components of interest on the IC 20 or at points to be monitored within the IC 20. For example, a first element 21 of the ring oscillator and a different element 25 of the ring oscillator, both being placed near edges of the IC 20, may experience significantly different operating conditions than a different element 22 placed in proximity to a high frequency arithmetic logic unit ("ALU") 27. Consequently, the first element 21 may exhibit a substantially different change in its propagation delay than that of a second element 22. For example, unused gates within the ALU 27 may be included as logic elements of the ring oscillator. In the latter example, the ring oscillator may better monitor operating conditions for specific circuit structures, within selected functional elements and in certain physical locations within the IC 20.

In some embodiments, each logic element in a group of logic elements 31 (see FIG. 3) may be constructed from the same cell library as the other logic elements in the group of logic elements. Each of the one or more groups of logic elements 31 provides a preferred propagation delay and may be constructed from one or more cell libraries. Other embodiments may provide elements constructed from logic cells from diverse cell libraries in order to capture disparate effects of operating conditions on various components of the IC 20. By way of example, a third element 23 may be constructed using a cell library identical to a library used to construct a register file 26, while a fourth element 24 may be constructed using a high-current cell library.

Figure 3:
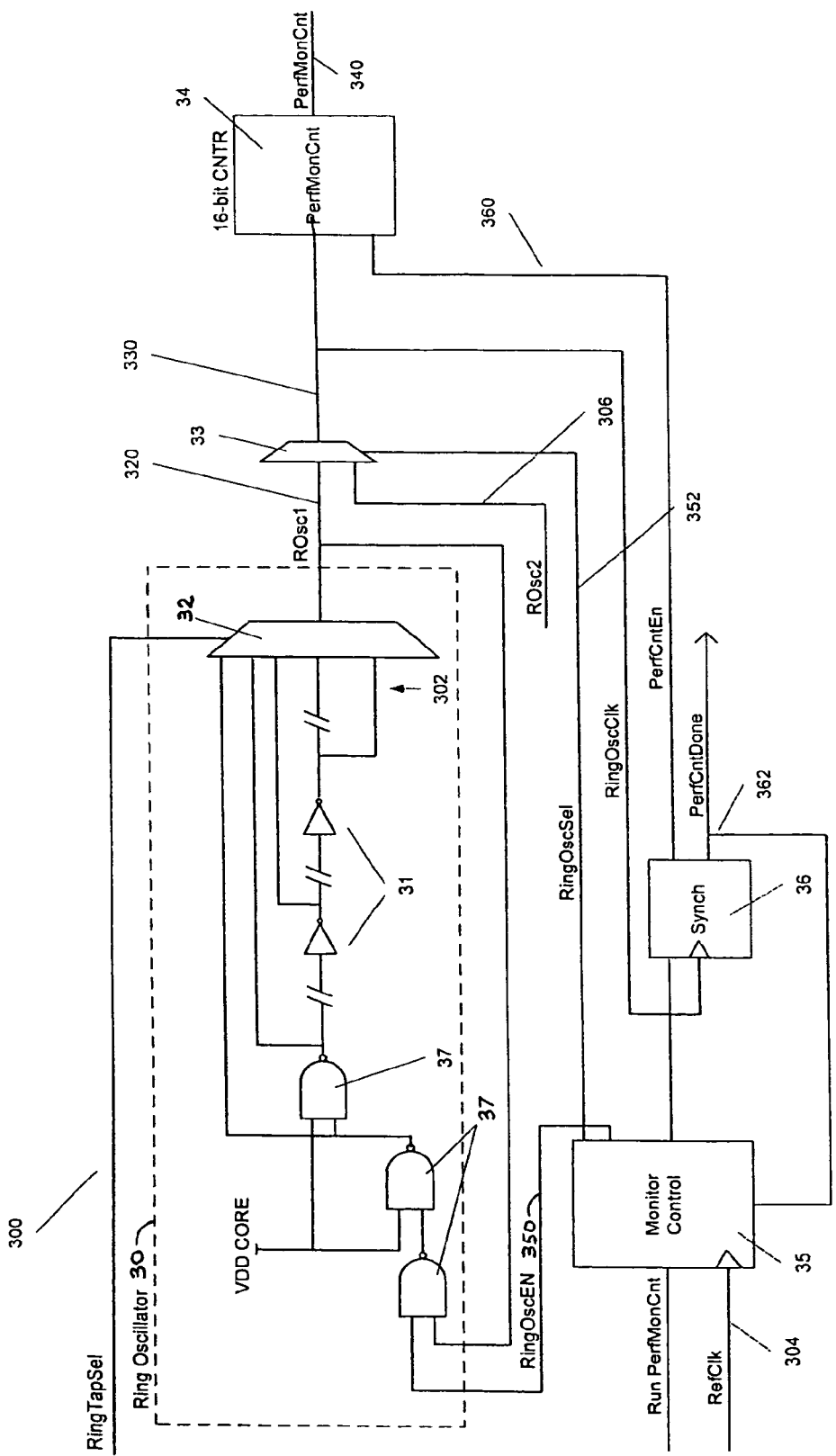
FIG. 3 is a schematic representation of an embodiment of the invention.

Referring now to FIG. 3, the drawing depicts another example of an embodiment of the invention. In this example, a first ring oscillator 30 comprises a plurality of control gates 37 and one or more groups of logic elements 31. The plurality of control gates 37 receives one or more control signals 350 that enable oscillation in the first ring oscillator 30. A first multiplexer 32 receives at inputs 302, outputs of the plurality of gates 37 and the one or more groups of inverters 31. The first multiplexer 32 selects one of the inputs 302 to serve as a first oscillator output signal 320. The first oscillator output signal 320 is fed back to the plurality of gates 37 to complete the first ring oscillator circuit 30. In some embodiments, where two or more ring oscillators are implemented, a second multiplexer 33 selects as an input, a signal from output signals 306 and 320 of the two or more ring oscillators. The selected ring output signal may be used to increment a counter (e.g. PerfMonCntr) 34. It will be appreciated that a counter could be provided for each ring oscillator. In the example of FIG. 3, two oscillator output signals 306 and 320 are shown and a Clock Select signal 300 is provided to control selection of the oscillator output signals 306 and 302 by the multiplexer 33 to be used as input to PerfMonCntr 34. The clock select signal 300 is typically controlled by software.

The first and second multiplexers 32 and 33 provide options for software to dynamically select modes of operation of the components. For example, in an IC that includes a plurality of voltage domains and controls multiple voltages, the software may cause the monitoring of each of a set of ring oscillators associated with each of the voltages and voltage domains. The software may also allow selection of frequency of oscillation for the first ring oscillator 30 by including or excluding one or more of the groups of inverters 31 in the ring oscillator loop using the first multiplexer 32.

Figure 4:
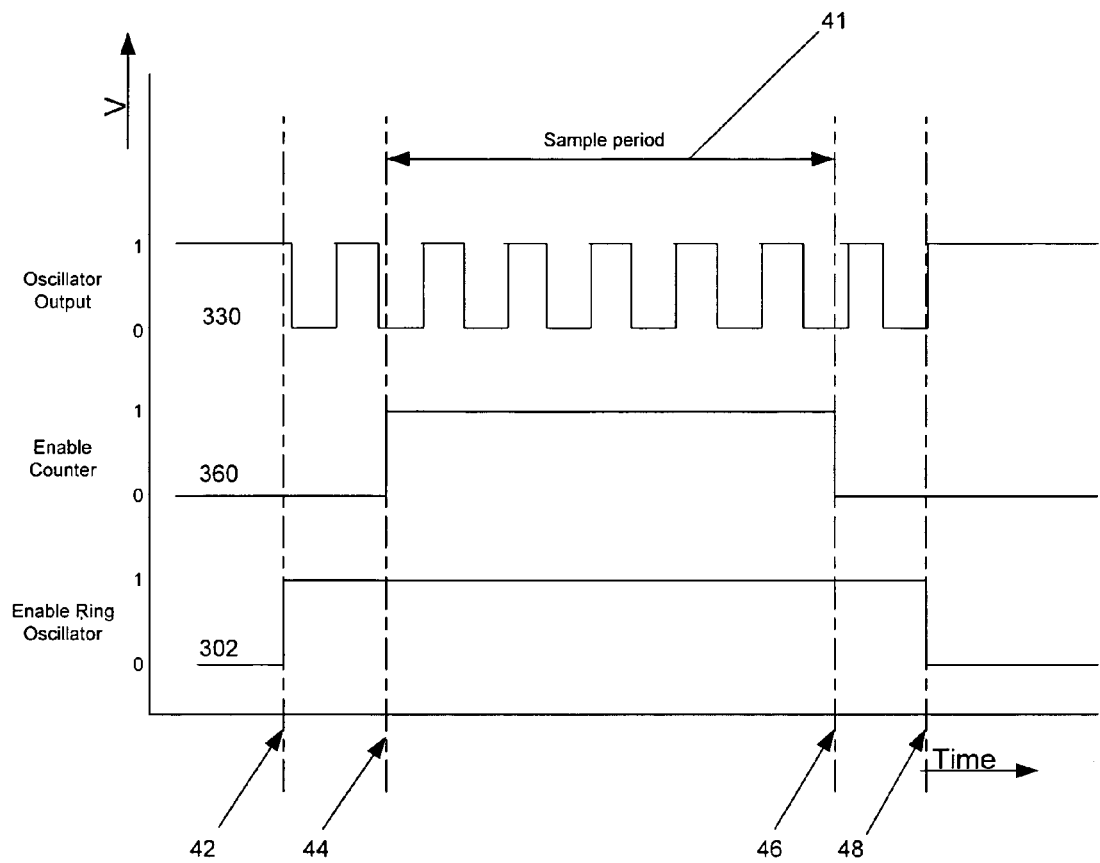
FIG. 4 is a timing diagram associated with an embodiment of the invention that monitors the performance of an IC.

Referring now to FIGS. 3 and 4, in some embodiments the frequency of oscillation of the ring oscillator 30 is measured by counting cycles of a selected oscillator output signal 330 using the counter 34. The counter is typically enabled for a selected period of time (hereinafter "the sample window") 41 by controlling a counter enable signal 360. The sample window 41 may be selected to provide a sufficiently large count thereby minimizing the impact of sampling and rounding errors. The sample window 41 is typically controlled by a monitor control element 35 that typically uses a reference crystal oscillator based clock signal 304 to generate a stable, repeatable sample window 41. In many embodiments, including for example the embodiment shown in FIG. 3, the monitor control element 35 is configured to enable the ring oscillator 30 and to select a counter clock signal 330 from the oscillator output signals 306, 320. Finally, a synchronizer 36 may be included to synchronize counter control signals 360 with the counter's clock signal 330.

Figure 5:
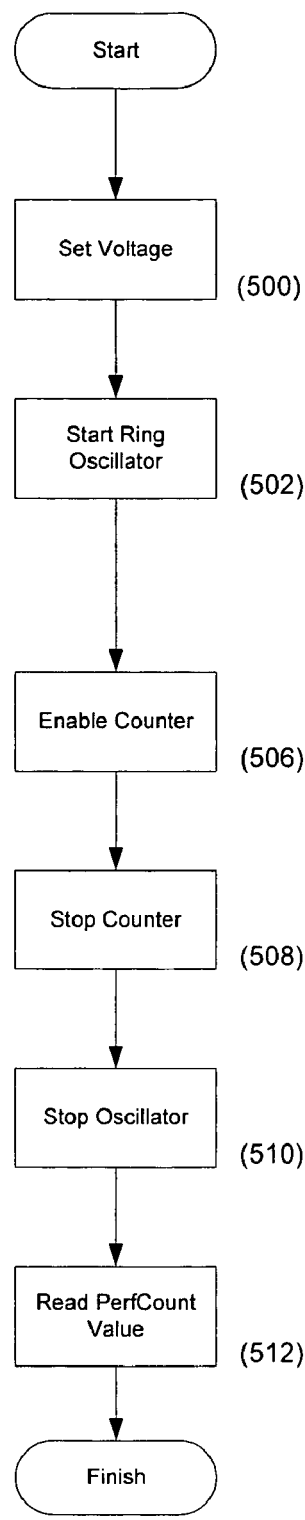
FIG. 5 is a flowchart illustrating an example of a process for measuring performance of an IC.

The operation of the previously discussed embodiments may be better understood by considering the method used to obtain a frequency measurement and by referring to FIGS. 3 and 4 and the flowchart of FIG. 5. The measurement process typically begins at step 500 when VDD, the operating voltage of the IC, is set to a selected voltage level. The voltage level may be selected based on known operating conditions or may be set during system initialization to a predetermined starting value, especially where operating conditions are indeterminate.

At step 502, the ring oscillator begins to oscillate when the ring oscillator control signal 350 is enabled (at time 42), causing the selected ring oscillator output 330 to begin oscillating reliably, i.e. switching between logic levels. At step 506, the counter 34 is enabled (at time 44) by setting the counter enable signal 360 such that the counter 34 begins to count cycles of the ring oscillator output 330. At step 508, and after the selected sample window of time 41, the counter 34 is disabled (as indicated at time 46) and the ring oscillator is disabled. The PerfMonCnt 340 of the counter 34 is subsequently read. This PerfMonCnt is used as a measure of $f_{MAX}$ and thus may be used to characterize current operating point of the IC.

Estimating $f_{MAX}$

Figure 6:
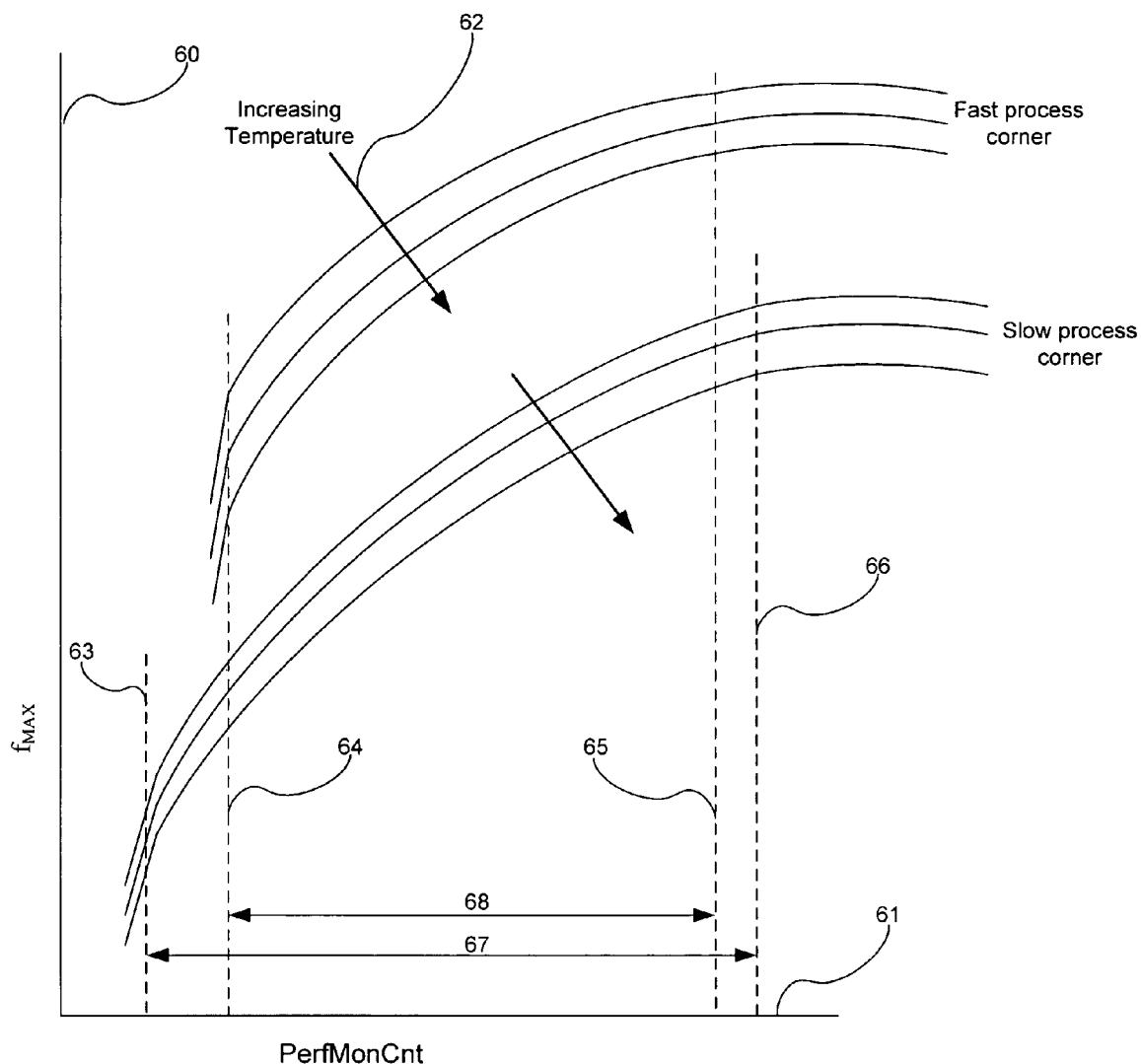
FIG. 6 is a conjectural graph plotting performance count value against maximum operating frequency of an IC.

Various embodiments of the invention use PerfMonCnt measurements to characterize performance of the IC or system. In some embodiments, an analytical relationship can be established between PerfMonCnt and $f_{MAX}$, while in other embodiments characterization is made by empirical methods. FIG. 6 depicts a graphical representation of a conjectural relationship between $f_{MAX}$ and ring oscillator frequency or equivalently, PerfMonCnt measurements. This graphical representation is based on a conjecture that the maximum achievable frequency of the device, as measured by the PerfMonCnt value (as described above) is likely to be an analytical function of VDD for a given process corner and may exhibit a change as the temperature is varied. The process corner is a set of characteristics associated with the fabrication of the IC 20, the fabrication process involving a sequence of steps that determine the electrical behavior of a semiconductor device. Examples of such fabrication process steps include diffusion with an associated dopant level. The process corner may be measured by the propagation delay of devices such as transistors fabricated using the fabrication technology. As will become apparent from a review of FIG. 6, discontinuities anticipated at various temperature points and fabrication process corners may cause non-linear transitions 63, 64, 65 and 66 in the curves and, therefore may delineate "safe" operating zones 67a, 68a. Regardless of whether characterization is made empirically or through calculation based on an analytical function, many embodiments of the invention provide a plurality of tables to express the relationship between PerfMonCnt and $f_{MAX}$ under all operating conditions.

Figure 7A:
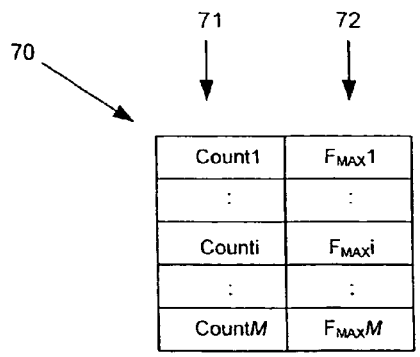
FIG. 7a is a block diagram showing an element of a characterization array.
Figure 7B:
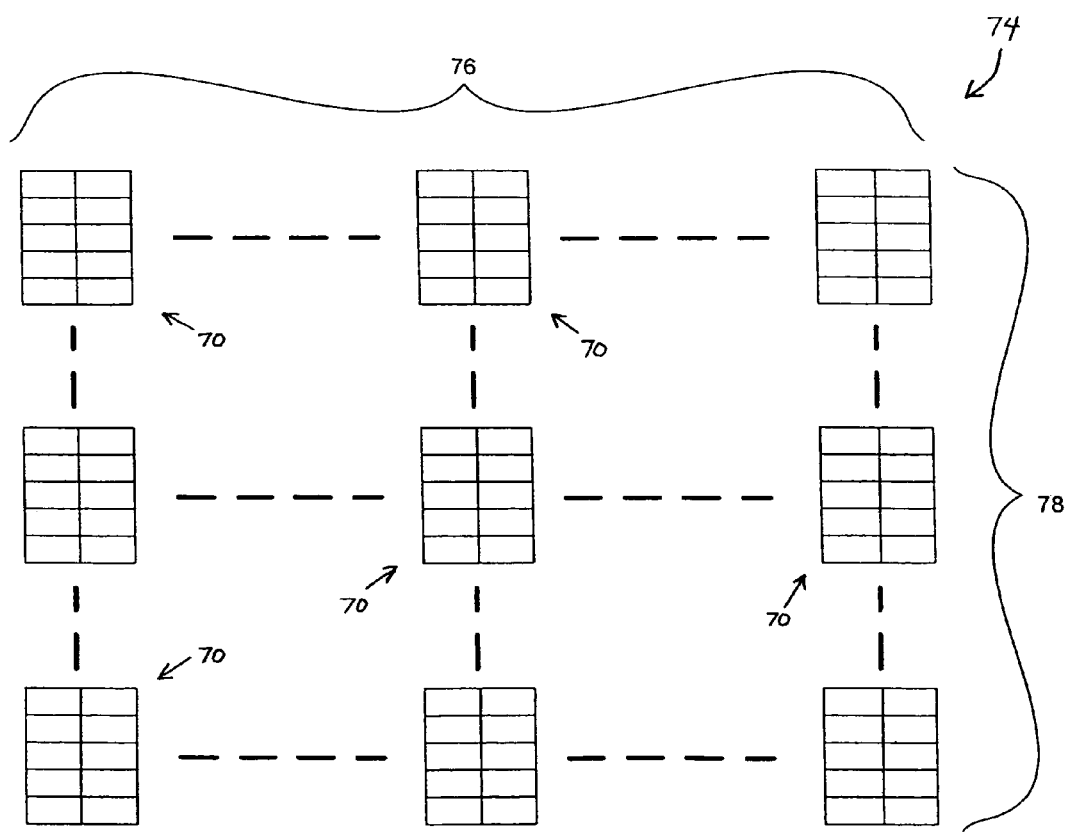
FIG. 7b is a block diagram showing a characterization array.

Referring now to FIGS. 7a and 7b, a simplified example of an element 70 of a characterization table is depicted in FIG. 7a. The simplified example element 70 includes a series of M values of $f_{MAX}$ ($f_{MAX1}$ to $f_{MAXM}$) 72 associated with M values of PerfMonCount ($C_1$ to $C_M$) 71. This example element typically contains information for an IC for a series of PVT combinations in which process and temperature parameters are held constant. It will be appreciated that a complete characterization table contains a plurality of elements 70 that may be organized in the form of an array 74 as shown in FIG. 7b. In the array 74, columns of elements 76 contain a plurality of elements 70 in which operating temperature is held constant. Additionally, the array 74 contains a plurality of rows 78 in which process parameters are held constant.

The information contained in the characterization table may be stored on the IC or accessed from external storage by the IC. In some embodiments, a characterization table can be provided in nonvolatile storage on the IC. The information in the characterization table may be stored during IC fabrication but can also be written to storage after IC fabrication. In at least some embodiments, an initial characterization table can be updated based on operationally obtained information or from external devices or software. Further, the characterization table may implemented as a combination of volatile and non-volatile storage and portions of the characterization table may be maintained external to the IC.

It will be appreciated that each device may be calibrated to use a single row from the characterization table since the effects of process are typically fixed after manufacture of the device. In many embodiments therefore, a device creates a calibration table upon first initialization that is selected or derived from the characterization table. Calibration may be performed by varying VDD and observing resultant changes in PerfMonCount. In many embodiments, a best-fit methodology is used to select an appropriate row of the characterization table for calibrating the device. In these embodiments, using an initial row selection based on likely fabrication process corner, a plurality of rows are iteratively compared to the results of a calibration test until a match is made. A match is typically determined to be made when the calibration array can be used to successfully predict changes in PerfMonCount after voltage adjustments.

The calibration table may be subsequently updated by recalibration performed under software control. Recalibration may be performed either at regular intervals or as a result of detecting a change in the system state. Examples of such changes in system state include initiation/termination of an application, enabling/disabling of new hardware, initiation of device functions, changes in operating conditions, changes in operating frequency, initiation of external bus transfers, and so on. In circumstances where operating frequency changes are to be made, VDD is typically adjusted to provide a suitable $f_{MAX}$. In these circumstances, many embodiments execute a performance monitor test to ensure that the PerfMonCount value is consistent with the desired $f_{MAX}$.

Figure 8:
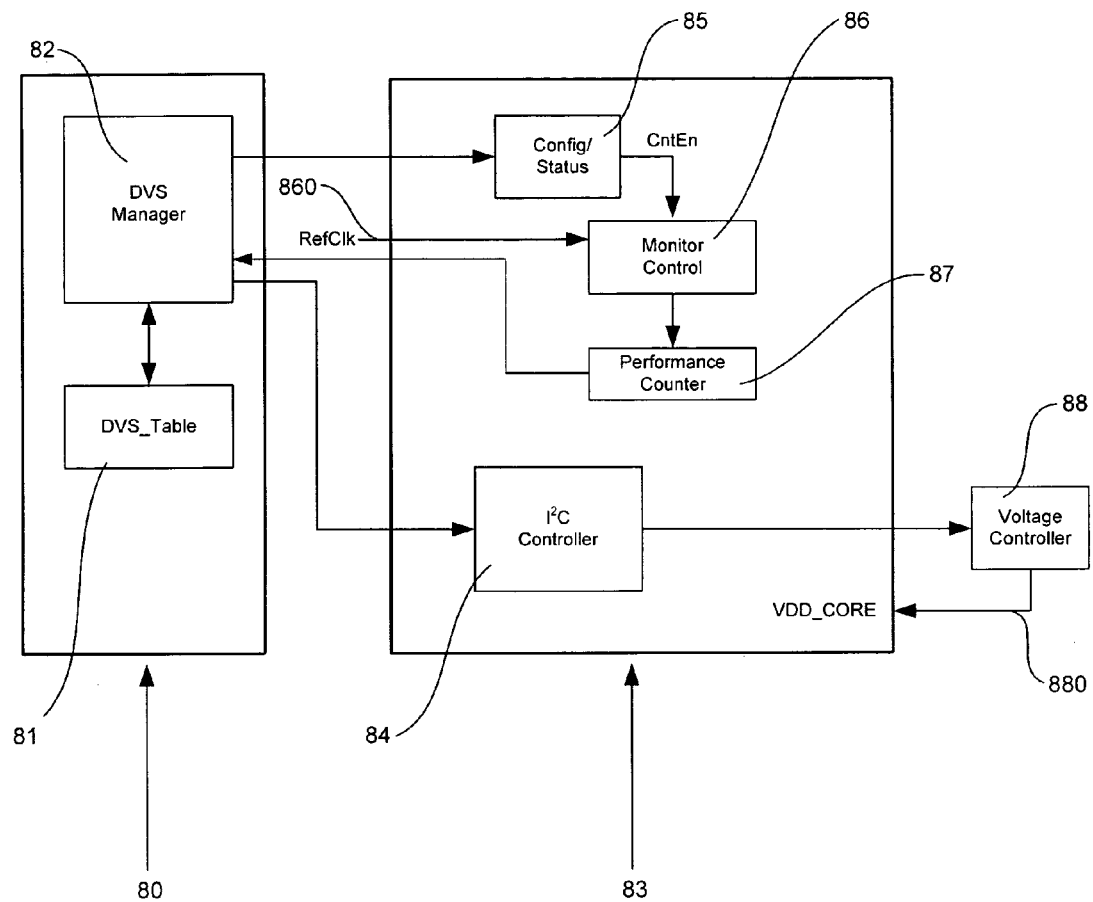
FIG. 8 shows an example of an apparatus for monitoring performance of an IC and dynamically adjusting the power consumption.

Referring now to FIG. 8, an example is provided of an apparatus incorporating an embodiment of the performance monitor counter of the present invention. In the example, a dynamic voltage scaling ("DVS") processor 80 initiates calibration and control of an IC 83. The DVS processor 80 may be implemented by combining various hardware and software components including microprocessors, microcontrollers, software routines, computers, digital signal processors, portable electronic devices and custom ASIC devices. In at least some embodiments, the DVS processor 80 is an integral part of the IC 83. A voltage (VDD) 880 is typically provided by a voltage controller 88. VDD 880 voltage levels are adjusted by the DVS processor 80 using, for example, an I²C controller 84 to communicate voltage setting information to the voltage controller 88. The voltage controller 84 may be a commercially available device with integrated I²C controller such as the Texas Instruments TPS65010 or may be constructed using, for example, an I²C controlled analog-to-digital converter combined with a voltage controller such as the Linear Technology LTC3406B. It will be appreciated that other configurations of voltage controller 88 may be implemented and the voltage control or parts of the voltage controller 88 may be included within the IC 83.

In this latter embodiment, the DVS processor includes a dynamic voltage scaling system comprising a DVS manager 82 and DVS table 81. The DVS manager typically includes software components for performing calibration and voltage adjustment functions in response to system and application needs as described. The DVS table 81 includes device characterization arrays and current calibration information, and the DVS table can be implemented in any suitable memory construct including databases, arrays, structures, linked lists and tables. It will be appreciated, however, that aspects of the present invention may be automated and, in some embodiments, implemented within the IC device such that no processor is required to monitor operating conditions and calculate voltage based on measured results.

The DVS manager 82 initiates performance monitoring sequences by transmitting control signals to the IC 83. The control signals are received and interpreted by a configuration and status element 85, monitor control logic 86 and the performance counter (PerfMonCntr) 87. The DVS manager 82 reads results from the PerfMonCntr 87 and calculates $f_{MAX}$ from the results. Calculations may involve a sequence of measurements performed with various VDD settings (as described above) and subsequent comparison with information contained in the DVS table 81.

Some embodiments of the invention use a deductive process to determine current operating conditions. For any IC device incorporating these embodiments, only two of the three PVT factors are variable because the process factor is fixed at time of manufacture. Further, the Voltage factor is typically controlled by a DVS processor, leaving only the operating temperature as an uncontrolled variable. Typically, operating temperature is deduced by reading a series of PerfMonCnt associated with set of selected voltages. The series of PerfMonCnt can be matched to a set of characteristics provided in the DVS tables. It will be appreciated that the process and operating temperature factors may be evaluated by such deduction.

In other embodiments, the operating temperature factor may be evaluated using one or more temperature sensors attached to the IC device or located in proximity to the IC device. In at least some of these embodiments, the temperature sensor is an integral part of the IC device. The DVS processor typically obtains an operating temperature from the one or more temperature sensors, a plurality of PerfMonCnt values and an estimation of the process factor. Using this information, the DVS processor may then select a voltage level to provide a desired $f_{MAX}$.

The present invention provides methods for controlling a plurality of $f_{MAX}$ values in complex and distributed systems. A single IC device may include a plurality of sections differentiated by, for example, voltage domains, multiple processor components and multiple operating frequencies. Embodiments of the invention provide monitoring and control of the plurality of sections of the IC device to optimize overall system performance.

It will be appreciated that monitoring and control can be extended to optimize the performance of multiple IC devices. In some embodiments of the invention, individual IC devices provide external access to monitoring and control information and processes and may receive monitoring and control information from other devices. In other embodiments, the supply voltage being controlled may be generated within the IC 20 thus eliminating the need for interface to an external voltage supply source. Thus, various schemes may be implemented to coordinate frequency and voltage monitoring and control within an associated set of IC devices.

It is apparent that the above embodiments may be altered in many ways without departing from the scope of the invention. Further, the invention may be expressed in various aspects of a particular embodiment without regard to other aspects of the same embodiment. Still further, various aspects of different embodiments can be combined together. Accordingly, the scope of the invention should be determined by the following claims and their legal equivalents.

What is claimed is:

1. A method for dynamically controlling maximum operating frequency of an integrated circuit (IC) using one or more integral oscillators, the method comprising:
    measuring current frequency of operation for certain of the one or more oscillators;
    identifying an operating point of the IC based on the current frequency and stored information, the stored information including a current voltage; and
    adjusting one or more operating voltages of the IC to obtain a desired frequency of operation of the oscillator,
    wherein each oscillator comprises a plurality of logic gates, the plurality of logic gates forming a ring and being positioned on the IC to provide a representative indication of the operating point, wherein the IC comprises a second circuit that comprises a gate that is unused by said second circuit, wherein said gate is utilized as a logic element of at least one of the one or more oscillators to monitor operating conditions of said second circuit.

2. The method of claim 1, wherein the second circuit is an arithmetic logic unit (ALU) of the IC.

3. The method of claim 2, wherein the logic gates of at least one oscillator are dispensed throughout the IC.

4. The method of claim 2, wherein the logic gates of at least one oscillator are located proximately to an area of interest on the IC.

5. The method of claim 1, wherein a logic gate of at least one oscillator is constructed using a cell library identical to a library used to construct the second circuit.

6. The method of claim 1, wherein the IC includes two or more portions, each portion supplied by an associated different operating voltage, and wherein the adjusting the operating voltage includes:
    identifying an operating point for each of the portions; and
    adjusting each of the different operating voltages independently to obtain a desired frequency of operation of an oscillator located in a position associated with the each voltage.

7. The method of claim 1, wherein the IC includes two or more oscillators, and wherein the identifying operating voltages includes:
    identifying operating points for each of the oscillators; and
    determining a maximum frequency of operation of the IC using information including information related to the operating points for each of the oscillators.

8. The method of claim 1, wherein the identifying an operating point includes obtaining a temperature of the IC from a temperature sensor.

9. The method of claim 1, wherein the identifying an operating point includes indexing characterization information using current operating voltage and the current frequency to obtain the operating point.

10. The method of claim 9, wherein the adjusting operating voltage includes indexing the characterization information based on the current operating point and the desired frequency to obtain a next operating voltage.

11. The method of claim 9, wherein the characterization information is obtained by recording frequencies of operation of the one or more oscillators for a plurality of combinations of operating voltage and temperature.

12. The method of claim 9, wherein the characterization information is stored on the IC.

13. The method of claim 9, wherein the characterization information is stored external to the IC.

14. The method of claim 9, further comprising the recording the current frequency and the current operating point in the characterization information.

15. The method of claim 1, wherein the desired information is determined by software.

16. The method of claim 1, wherein the desired information is determined by hardware.

17. An apparatus for optimizing power consumption and frequency of operation in an IC, the apparatus comprising:
    a ring oscillator including a plurality of logic gates located on the IC, wherein the IC comprises a second circuit that comprises a gate that is unused by said second circuit, wherein said gate is utilized as a logic element of the ring oscillator to monitor operating conditions of said second circuit;
    a counter for measuring cycles of the ring oscillator in a predetermined interval;
    a variable voltage source providing voltages to the IC, wherein voltage level is set to obtain a desired frequency of operation, wherein
    the measured cycles are compared to stored values to obtain a current operating point, and
    the voltage level is set based on the current operating point.

18. The apparatus of claim 17, wherein the stored values include calibration information relating frequency of oscillation of the ring oscillator to a plurality of characteristics including operating temperature and operating voltage.

19. The apparatus of claim 17, wherein the second circuit is an arithmetic logic unit (ALU) of the IC.

20. The apparatus of claim 17, wherein the stored values are maintained external to the IC.

21. An apparatus according to claim 17, further comprising one or more additional ring oscillators, wherein the additional oscillators are configured to obtain operating points for different portions of the IC.

22. An apparatus according to claim 21, wherein the different portions include portions comprising elements constructed from a common cell library.

23. An apparatus according to claim 21, wherein the different portions include portions comprising elements constructed from different cell libraries.

24. An apparatus according to claim 21, wherein the different portions include portions contained within a selected area of the IC.

25. An apparatus according to claim 21, wherein the different portions include portions sharing a common power supply.

26. A method for characterizing an IC, the method comprising:
    setting a voltage of operation for the IC;

after said setting, measuring frequency of operation of an oscillator integral to the IC, the oscillator comprises a plurality of logic gates, wherein the IC comprises a second circuit that comprises a gate that is unused by said second circuit, wherein said gate is a logic element of the oscillator that monitors operating conditions of said second circuit;

obtaining a temperature of the IC;

recording, in a table, the voltage, temperature and frequency; and iteratively repeating the setting, measuring, obtaining and recording for a desired range of voltage and temperatures.

* * * * *